US012214359B1

(12) United States Patent
Eggert et al.

(10) Patent No.: US 12,214,359 B1
(45) Date of Patent: Feb. 4, 2025

(54) COLLOID MILL

(71) Applicant: Fristam Pumps USA Limited Partnership, Middleton, WI (US)

(72) Inventors: Matthew D. Eggert, Sauk City, WI (US); Duane D. Ehlke, Waunakee, WI (US)

(73) Assignee: Fristam Pumps USA Limited Partnership, Middleton, WI (US)

(*) Notice: Subject to any disclaimer, the term of this patent is extended or adjusted under 35 U.S.C. 154(b) by 334 days.

(21) Appl. No.: 17/696,398

(22) Filed: Mar. 16, 2022

(51) Int. Cl.

| | |
|---|---|
| ***B02C 2/00*** | (2006.01) |
| ***B02C 7/02*** | (2006.01) |
| ***B02C 7/14*** | (2006.01) |
| ***B02C 7/175*** | (2006.01) |
| ***B02C 23/18*** | (2006.01) |
| ***D21D 1/30*** | (2006.01) |
| *B02C 7/18* | (2006.01) |
| *D21D 1/34* | (2006.01) |

(52) U.S. Cl.
CPC .................. *B02C 2/00* (2013.01); *B02C 7/02* (2013.01); *B02C 7/175* (2013.01); *B02C 23/18* (2013.01); *D21D 1/30* (2013.01); *B02C 7/14* (2013.01); *B02C 7/186* (2013.01); *D21D 1/34* (2013.01)

(58) Field of Classification Search
CPC ........... B02C 7/14; B02C 7/175; B02C 7/186; B02C 7/11; B02C 7/16; B02C 7/17
See application file for complete search history.

(56) References Cited

U.S. PATENT DOCUMENTS

| | | | | |
|---|---|---|---|---|
| 1,871,127 | A | 8/1932 | Nester | |
| 2,083,171 | A | 6/1937 | Nester | |
| 2,850,246 | A * | 9/1958 | Rees | B02C 7/06 241/278.1 |
| 3,224,689 | A * | 12/1965 | Behrens | B02C 7/175 241/1 |
| 3,658,266 | A | 4/1972 | O'Keefe et al. | |
| 4,113,189 | A | 9/1978 | Sullivan | |
| 4,948,056 | A | 8/1990 | D'Errico | |
| 6,305,626 | B1 | 10/2001 | Korstvedt | |
| 6,745,961 | B2 | 6/2004 | Korstvedt | |
| 10,654,044 | B2 | 5/2020 | Aitken | |
| 2011/0315799 | A1* | 12/2011 | Merle | B02C 7/10 241/98 |
| 2021/0046485 | A1* | 2/2021 | Johnson | B02C 7/175 |

FOREIGN PATENT DOCUMENTS

| | | | | |
|---|---|---|---|---|
| CN | 201164809 | | 12/2008 | |
| CN | 114214859 | A * | 3/2022 | |
| DE | 3819138 | | 12/1989 | |
| EP | 4114572 | B1 * | 3/2024 | B02C 7/04 |

* cited by examiner

*Primary Examiner* — Jared O Brown
(74) *Attorney, Agent, or Firm* — Craig Fieschko; DeWitt LLP

(57) ABSTRACT

The shear gap between a rotor and a stator in a colloid mill is adjusted by translating the stator with respect to the rotor, preferably by moving the stator along a helical path about the rotor, thereby moving the stator's surface closer to or further from the rotor's surface (and altering the shear gap therebetween). Helical slots are provided in the casing about the stator, with members extending from the stator through the slots, whereby the members can be grasped and rotated about the casing to move the stator. Channels allowing circulation of buffer fluid are provided about the stator and rotor to deter ingress of the fluid being processed into junctures between components of the colloid mill.

7 Claims, 4 Drawing Sheets

100
152
170
168
116
114B
128
146
162
160
114
114C
114A
174
156
118
114D
130
126
122
176
124

100
114C
160
162
146
114
128
122
126
116
168
114B
114A
170
152
156
174
172
118
114D
148
176
138
124

COLLOID MILL

FIELD OF THE INVENTION

This document concerns an invention relating generally to equipment for processing fluids, and more specifically to colloid mills.

BACKGROUND OF THE INVENTION

Colloid mills are used in the food, pharmaceutical, cosmetic, paint, and other industries to reduce the particle sizes of matter in suspension, or of emulsified droplets, in a fluid. In a colloid mill, the fluid to be processed is fed through a shear gap between a high-speed rotor and a stator, with the shear imparted by the rotor serving to break the suspended matter or droplets into smaller sizes (with higher shear typically resulting in smaller particle/droplet sizes).

Control of the shear applied by a colloid mill—and thus the resulting particle/droplet size within the processed fluid—is typically important. For example, when processing a foodstuff (such as a salad dressing, mayonnaise, yogurt, etc.), appropriate particle/droplet size is typically needed to obtain a particular texture/mouthfeel, to deter settling/separation of components, etc. Shear is primarily determined by rotor speed and the size of the shear gap, but while many colloid mills allow adjustment of rotor speed, they do not readily allow adjustment of the shear gap without time-consuming disassembly (e.g., to replace or reposition one or both of the rotor and stator). Many colloid mills also require some amount of disassembly for complete cleaning. These factors generate unwanted downtime and labor costs.

SUMMARY OF THE INVENTION

The invention, which is defined by the claims set forth at the end of this document, is directed to a colloid mill which at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

The colloid mill allows rapid alteration of the rotor/stator gap, and thus the shear induced on fluid flowing between the rotor and stator, by moving the stator with respect to the rotor. Referring to the exemplary version of the colloid mill 100 shown in the accompanying drawings, FIGS. 1 and 4-5 show the mill 100 in its closed (minimum gap 102) state, and FIGS. 2 and 6-7 show the mill 100 in its open (maximum gap 102) state. The colloid mill 100 has a rotor 104 (FIGS. 3, 5, and 7) with a tapered outer rotor surface 106 (here a frustoconical outer rotor surface), with the rotor 104 being driven by a rotor shaft 108; a stator 110 with a tapered inner stator surface 112 wherein the rotor 104 is situated (the inner stator surface here having a frustoconical shape complementary to that of the outer rotor surface 106); and a casing 114 situated about the stator 110 and rotor 104. The casing 114 includes a fluid inlet 116 and a fluid outlet 118 (best seen in FIGS. 1 and 2), and a fluid shear path extends from the fluid inlet 116 to the fluid outlet 118 to pass through the shear gap 102 between the outer rotor surface 106 and the inner stator surface 112 (as best seen in FIG. 7). At least one of the inner stator surface 112 and the outer rotor surface 106 bears protrusions 120 extending therefrom (here, as best seen in FIG. 3, ridges extending in planes coincident with the axis of rotation of the rotor 104). Thus, fluid entering the fluid inlet 116 is sheared between the (rotating) rotor 104 and stator 110 as it flows toward the fluid outlet 118.

As best seen by comparison of FIGS. 5 and 7, the stator 110 is movable within the casing 114 with respect to the rotor 104, with such movement altering the shear gap 102 between the outer rotor surface 106 and the inner stator surface 112: as the stator 110 translates from its open position in FIG. 7 toward its closed position of FIG. 5, with the inner stator surface 112 more fully receiving the rotor 104 therein, the tapered inner stator surface 112 approaches the tapered outer rotor surface 106. The translation is preferably effected by providing a member 122 which extends from the stator 110 through a helical slot 124 (FIGS. 1-2) defined in the casing 114, whereby the member 122 can be grasped and rotated about the casing 114 through the slot 124. This moves the stator 110 along a helical path within the casing 114, with the stator 110 both rotating and translating about the rotor 104 (and with such translation altering the shear gap 102). The member 122 preferably has a knob 126 threaded thereon, whereby rotating the knob 126 about the member 122 can fix the member 122 within the slot 124 (here by the knob 126 urging a sleeve 128 fit about the member 122 against the casing 114), thereby fixing the stator 110 at a desired location to provide a desired shear gap 102. This adjustment of the shear gap 102 can beneficially be performed at any time (e.g., during operation of the colloid mill 100) with minimal effort: no disassembly of the colloid mill 100 is needed, and as the distance between the fluid inlet 116 and fluid outlet 118 remains unchanged during adjustment, an operator need not reconfigure any fittings/components connected to the inlet 116 and outlet 118.

The colloid mill 100 also preferably includes features which enhance its sanitation and cleanability. Apart from allowing flushing by connecting the fluid inlet 116 and the fluid outlet 118 to respective supply and drain lines for cleaning solution (such as water with detergents/disinfectants), buffer solution may be circulated through the mill 100 to deter the fluid being sheared/processed from entering junctures between mill components (where, for example, a fluid foodstuff under processing might decompose and form a source of bacterial contamination). Buffer solution may be supplied to a buffer inlet 130 (FIG. 1) to flow through annular seal channels 132 in a rotor seal 134 situated about the rotor shaft 108 between the rotor shaft 108 and the casing 114 (FIGS. 3, 5, and 7), with the seal channels 132 being bounded by the (stationary) seal 134 and the (rotatable) rotor shaft 108, and with the buffer fluid then exiting the seal channels 132 at a rotor buffer outlet 136 (FIGS. 2 and 5). The buffer solution flowing through the seal channels 132 therefore deters the fluid under processing from collecting between the rotor 104 and the seal 134 (also carrying away any fluid that happens to reach the seal channels 132), and additionally helps to cool the seal 134 during rotation of the rotor 104 therein. The buffer solution then flows from the rotor buffer outlet 136 through a first fluid bridge 138 (FIGS. 2 and 5) to a stator buffer inlet 140, which supplies the buffer solution to a first annular stator channel 142A (best seen in FIG. 5) in the casing 114 adjacent the first (inlet) side of the stator 110. The stator channel 142A is situated between (and bounded by) the casing 114 and the stator 110, and is preferably bounded on opposing sides by seals 144 (e.g., O-rings) situated between the casing 114 and the stator 110 to help retain the buffer solution within the stator channel 142A. The buffer solution then travels through a second fluid bridge 146 (FIGS. 1 and 2) to a second annular stator channel 142B (best seen in FIG. 5) in the casing 114 adjacent the second (outlet) side of the stator 110, and then to a buffer outlet 148 (FIGS. 2 and 5). The buffer solution flowing through the stator channels 142A and 142B therefore deters the fluid under processing from collecting between the stator 110 and the casing 114, and also carries away any fluid that happens to reach the stator channels 142A and 142B.

Further potential advantages, features, and objectives of the invention will be apparent from the remainder of this document in conjunction with the associated drawings.

DETAILED DESCRIPTION OF EXEMPLARY VERSIONS OF THE INVENTION

Figure 3:
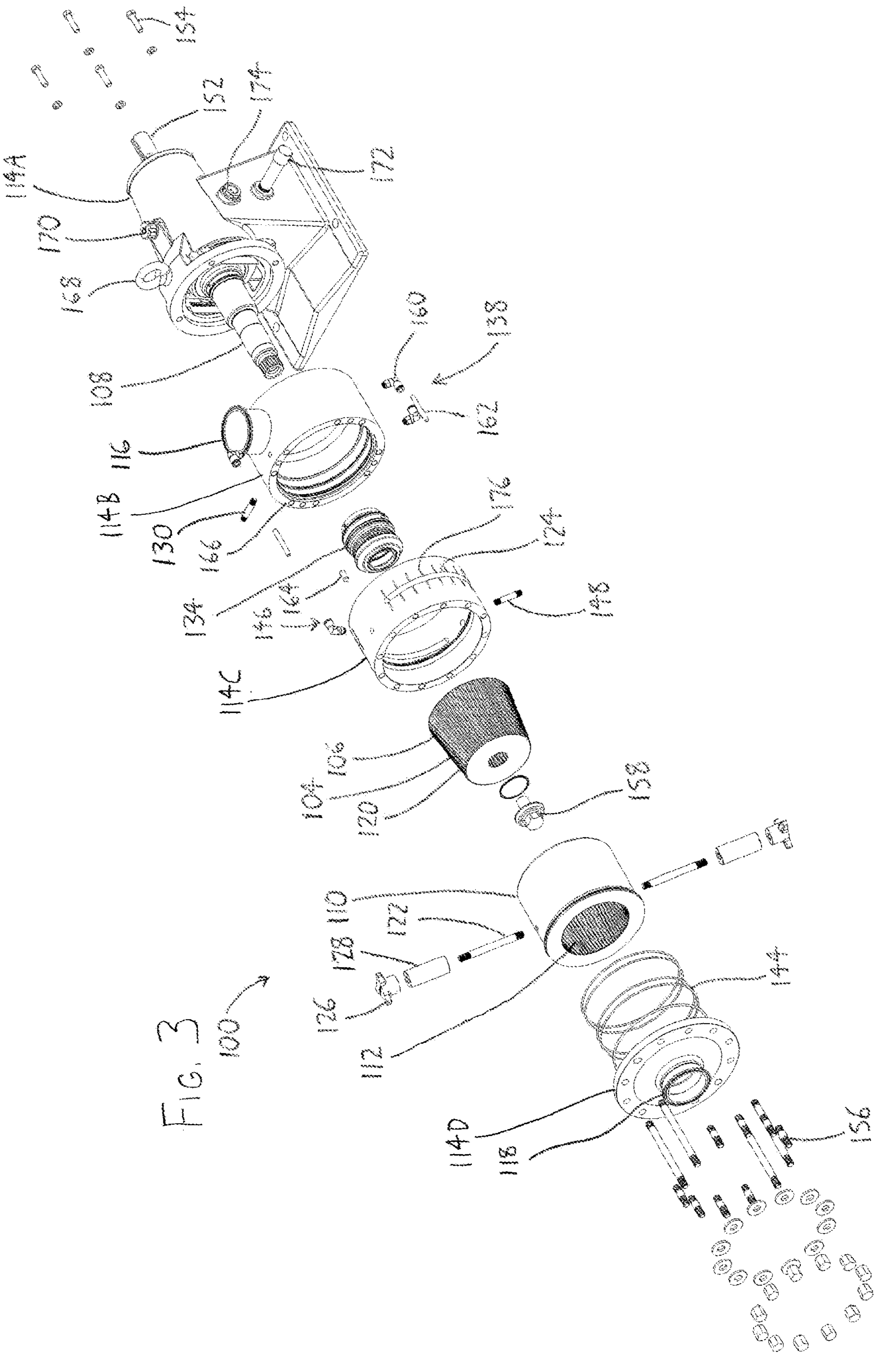
FIG. 3 is an exploded (disassembled) view of the colloid mill 100.
Figure 4:
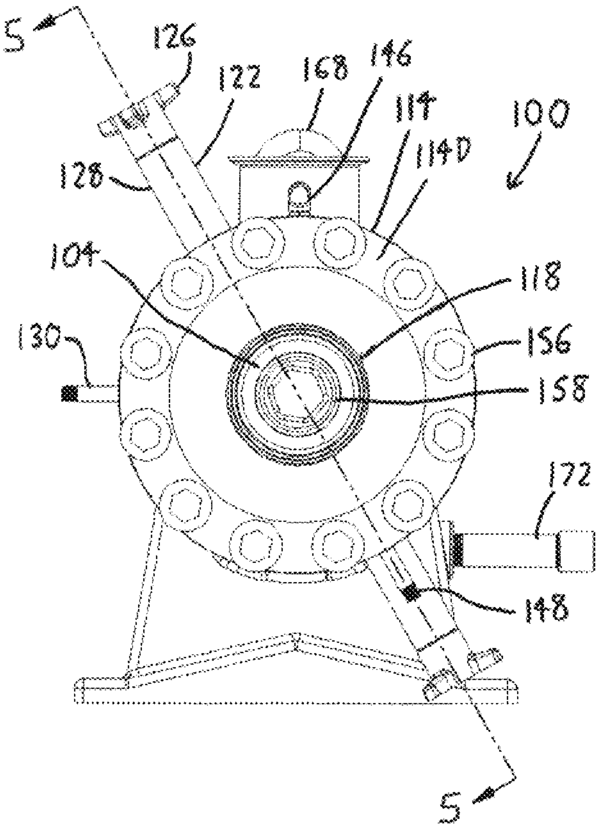
FIG. 4 is an end view of the colloid mill 100 in the closed state of FIG. 1.
Figure 5:
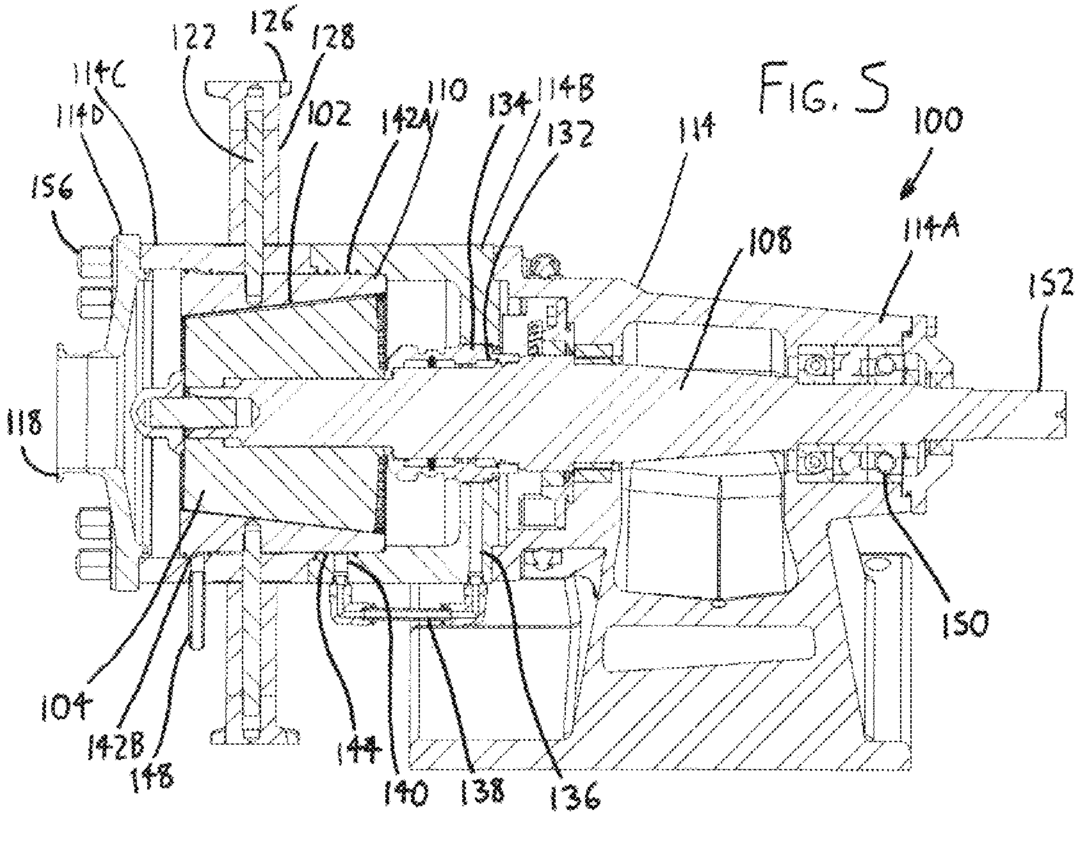
FIG. 5 is a side elevational view of the colloid mill 100 sectioned along the plane 5-5 of FIG. 4.
Figure 6:
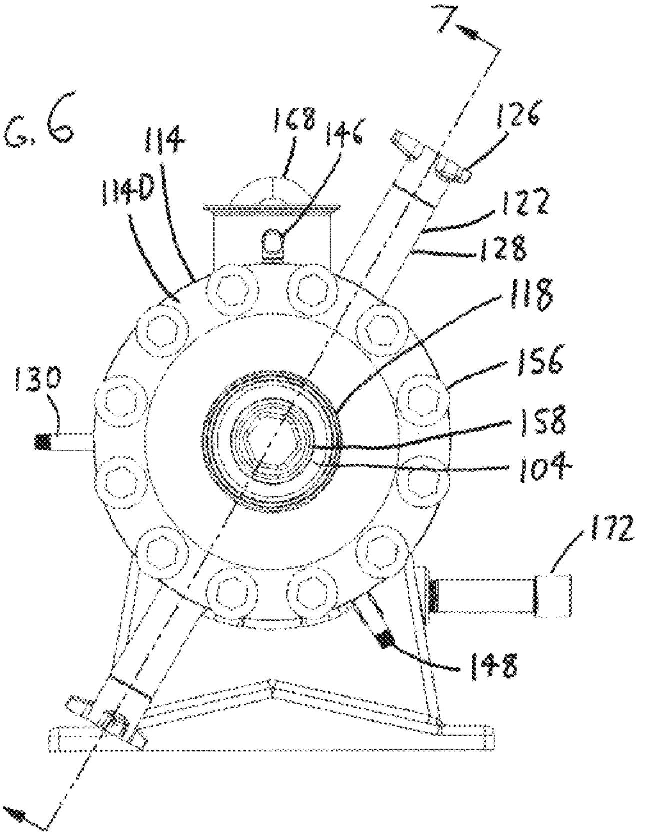
FIG. 6 is an end view of the colloid mill 100 in the open state of FIG. 2.
Figure 7:
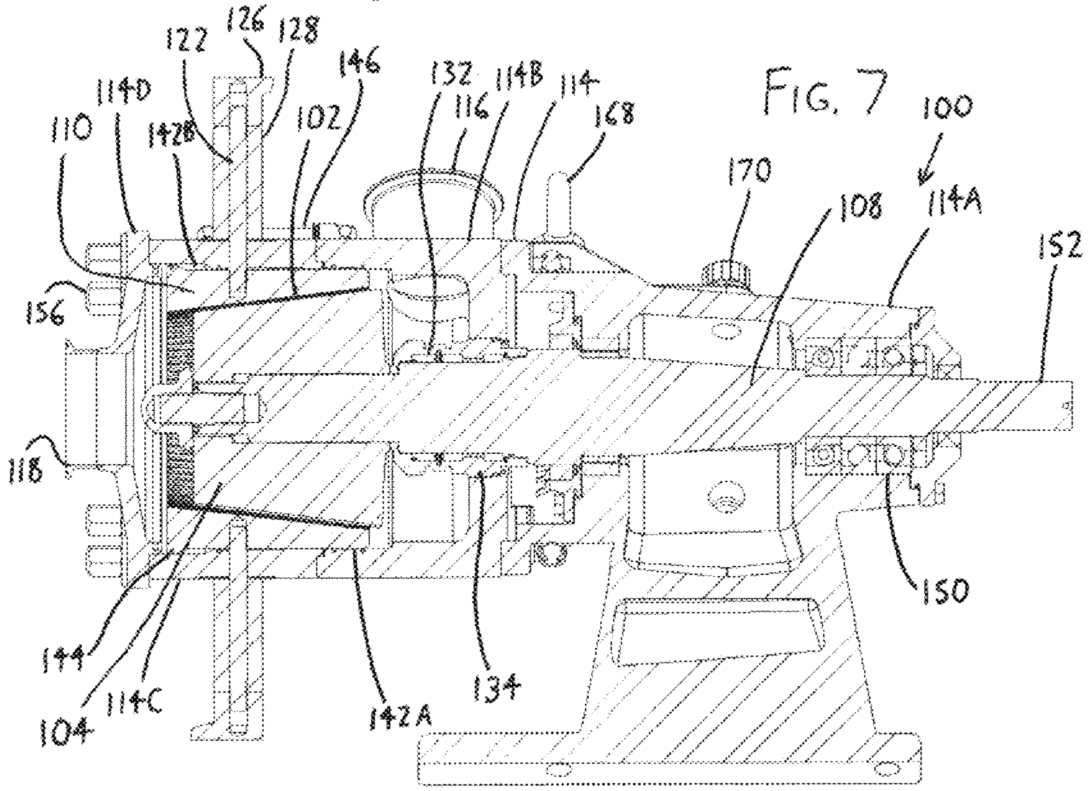
FIG. 7 is a side elevational view of the colloid mill 100 sectioned along the plane 7-7 of FIG. 6.

Expanding on the discussion above, the construction of the exemplary colloid mill 100 is best understood with reference to FIG. 3. The casing 114 includes a bearing block 114A, a fluid input section 114B having the fluid inlet 116 thereon, a stator adjustment section 114C which bears the member 122 for adjusting the stator 110 (and thus the shear gap 102), and a cover 114D which has the fluid outlet 118 thereon. The bearing block 114A rotatably supports the rotor shaft 108 on roller bearings 150 (FIGS. 5 and 7), with the rotor shaft 108 having an input end 152 allowing the rotor 104 to be rotatably coupled to an appropriate motor. The rotor shaft 108 is also supported by the seal 134 (as seen in FIGS. 5 and 7), which is fit within the end of the fluid input section 114B that is affixed to the bearing block 114A (via fasteners 154). The stator adjustment casing section 114C is affixed to the fluid input casing section 114B, with the stator 110 being closely fit within these sections so that it can rotate therein when the member 122 is manipulated. The casing cover 114D then closes the casing 114, and is attached to the stator adjustment casing section 114C (and to the fluid input section 114B) via fasteners 156. The rotor 104 is situated within the casing 114, and within the stator 110, over the rotor shaft 108 and between the seal 134 and a rotor fastener 158 (see also FIGS. 5 and 7).

Regarding the other components shown in FIG. 3, one seal 144 (O-ring) assists in sealing the casing cover 114D to the stator adjustment casing section 114C (see FIGS. 5 and 7), and the rest are paired to rest on opposite sides of the annular stator channels 142 defined on the inner circumference of the stator adjustment casing section 114C and the fluid input section 114B (see FIGS. 5 and 7). The first fluid bridge 138 (shown assembled in FIGS. 2 and 5) and second fluid bridge 146 (FIGS. 1 and 2) are shown disassembled into their component elbow connections 160 and bridge tubes 162, these bridge tubes 162 preferably being transparent to allow an operator to view buffer solution (typically water) therein. One alignment pin 164, which fits into blind holes 166 in the adjacent ends of the fluid input section 114B and the stator adjustment casing section 114C to assist with their alignment during installation of the fasteners 156, is also shown, with others not being shown for sake of clarity. The bearing block 114A includes a lifting eyelet 168 allowing it to be more easily lifted and repositioned by lifting equipment, as well as lubricant fittings for lubricating the roller bearings therein, namely a lubricant inlet 170, a lubricant drain 172, and a sightglass 174 for monitoring lubricant level within the bearing block 114A.

Figure 1:
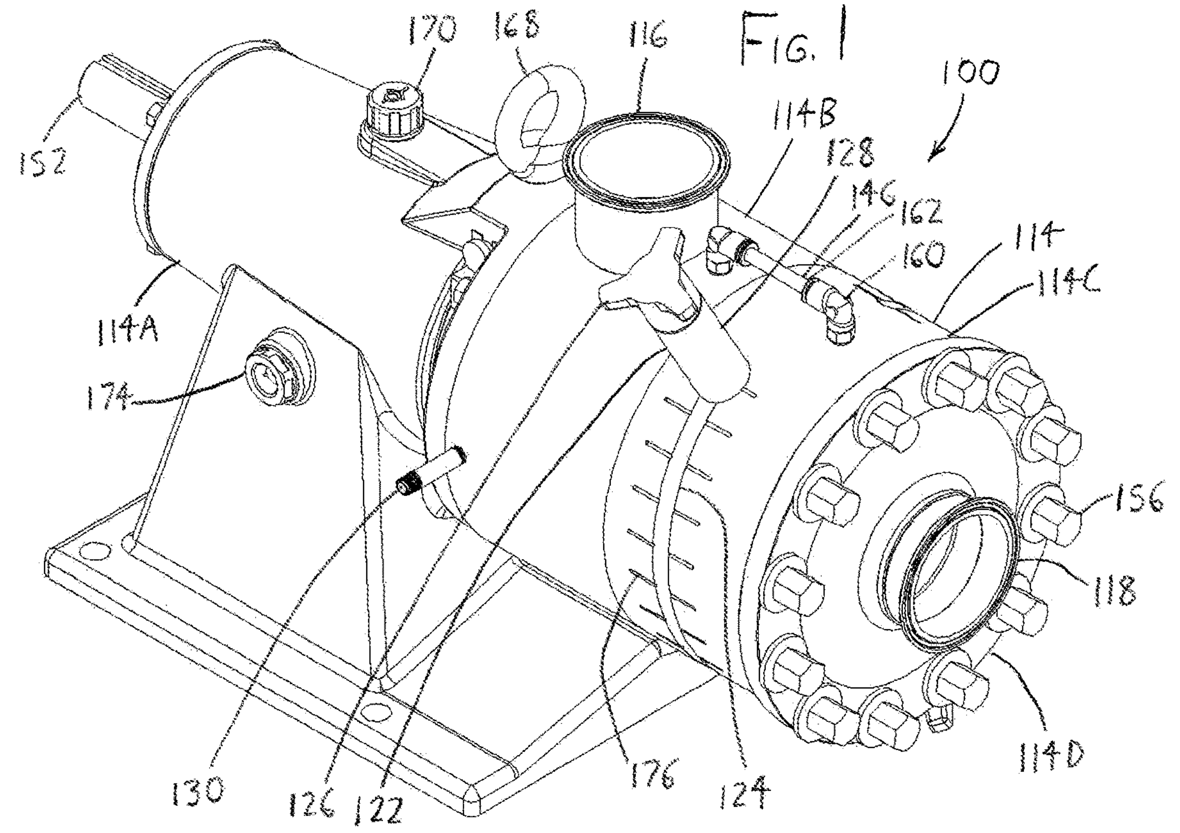
FIG. 1 is an isometric view of an exemplary version of the colloid mill 100 showing details of the right side of the mill 100, and showing the member 122 rotated about the casing 114 such that the mill 100 is in its closed state (minimum shear gap 102)
Figure 2:
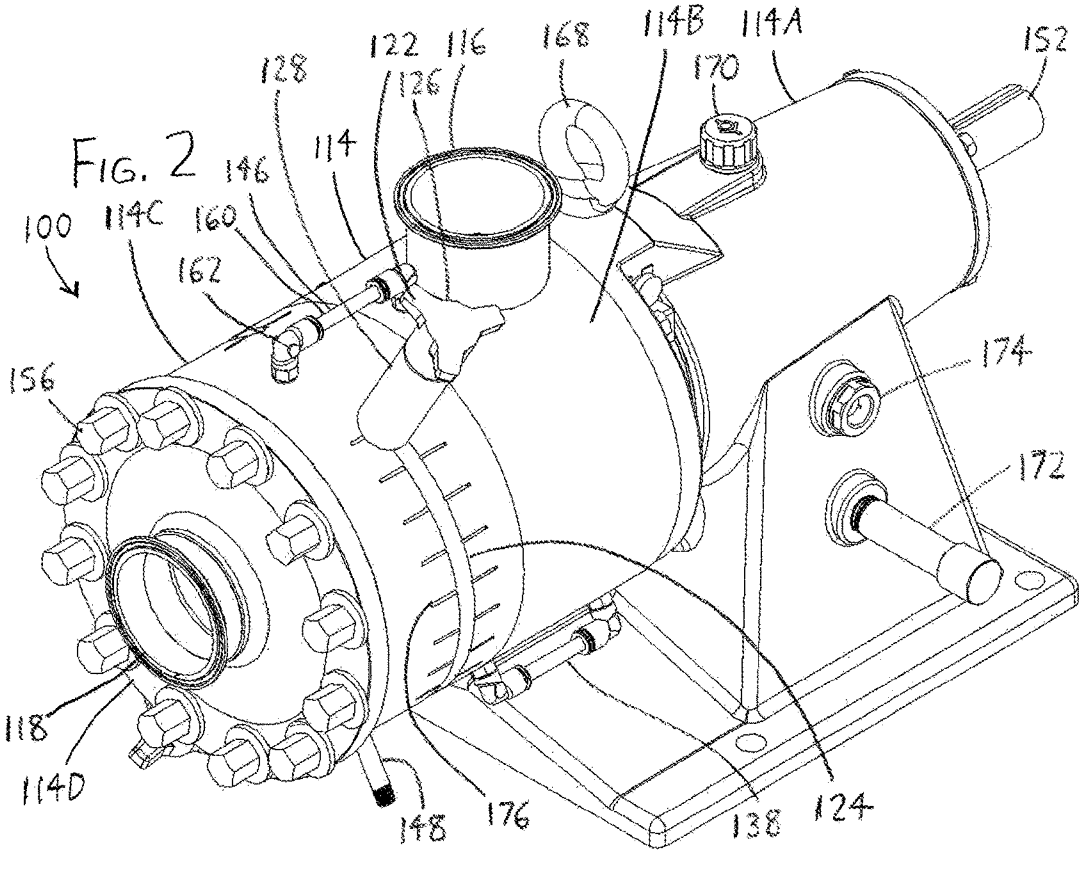
FIG. 2 is an isometric view of the colloid mill 100 showing its left side, and showing the member 122 rotated about the casing 114 such that the mill 100 is in its open state (maximum shear gap 102)

For greater ease in adjustment of the mill's shear gap 102, two members 122 (handles) are provided to adjust the stator 110, each being provided in a respective helical slot 124 on opposite sides of the stator adjustment casing section 114C. As best seen in FIGS. 1 and 2, these slots 124 may bear indicia along their lengths which indicate the size of the shear gap 102 when the members 122 are aligned with a given indicium. The members 122 can thus be rotated about the stator adjustment casing section 114C to attain a desired shear gap 102, and the knob 126*s* may be tightened to urge the sleeve 128*s* about the members 122 against the stator adjustment casing section 114C, thereby fixing the stator 110 in place (and fixing the shear gap 102 at the desired setting). While the colloid mill 100 solely uses the members 122 to rotationally and translatably affix the stator 110 within the casing 114, additional or alternative arrangements could be used, e.g., one or more members 122 affixed to the casing 114 could extend inwardly to engage one or more helical slots 124 defined on the outer surface of the stator 110.

The outer rotor surface 106 and inner stator surface 112 have frustoconical shapes, though other tapered shapes with complementary closely-fitting relationships (e.g., a dome-like outer rotor surface 106 and a concavely-curved inner stator surface 112) are possible. While the shear-enhancing protrusions 120 on the outer rotor surface 106 and the inner stator surface 112 are depicted as ridges which extend coplanarly with the axis of rotation of the rotor 104, other protrusions 120 (teeth, helices, etc.) could alternatively or additionally be used, and protrusions 120 need not be provided on both the rotor 104 and the stator 110.

To operate the colloid mill 100, an operator connects a supply of the fluid to be processed to the fluid inlet 116, connects an appropriate fixture to the fluid outlet 118 to receive the processed fluid, and simply uses the members 122 to adjust the shear gap 102 as desired (either prior to or during rotor 104 operation/shearing). Buffer solution, typically warm water, is preferably fed through the mill 100 during operation (and during post-operation cleanout) via the buffer inlet 130 and buffer outlet 148 to deter incursion of the fluid being processed into any spaces between the seal 134 and the rotor 104, and between the stator 110 and the casing 114.

The version of the colloid mill 100 depicted in the drawings and described above is merely exemplary, and the invention is not intended to be limited to this version. Rather, the scope of rights to the invention is limited only by the claims set out below, and the invention encompasses all different versions that fall literally or equivalently within the scope of these claims. In these claims, no element therein should be interpreted as a "means-plus-function" element or a "step-plus-function" element pursuant to 35 U.S.C. § 112(f) unless the words "means for" or "step for" are explicitly used in the particular element in question.

What is claimed is:

1. A colloid mill including:

a. a rotor having a tapered outer rotor surface, b. a rotor shaft extending from the rotor, c. a seal situated about the rotor shaft, d. a seal channel bounded by the seal and the rotor shaft, e. a stator having a tapered inner stator surface wherein the rotor is situated, f. a casing situated about the stator and rotor, the casing having a fluid inlet and a fluid outlet, g. a stator channel bounded by the casing and the stator, the stator channel being in fluid communication with the seal channel, h. a mill buffer inlet and a mill buffer outlet, each being in fluid communication with a respective one of the seal channel and the stator channel, whereby buffer urged into the mill buffer inlet flows through the seal channel and the stator channel to the mill buffer outlet, wherein:

(1) protrusions extend from one or more of the outer rotor surface and the inner stator surface, (2) the stator is movable within the casing with respect to the rotor, such movement altering the spacing between the outer rotor surface and the inner stator surface, (3) a fluid shear path is defined within the casing:

(a) between the fluid inlet and the fluid outlet, and (b) between the outer rotor surface and the inner stator surface.

2. The colloid mill of claim 1 wherein:

a. the rotor has a rotor rotational axis defined therein, and b. the stator is translatable within the casing along the rotor rotational axis.

3. The colloid mill of claim 1 wherein:

a. the rotor has a rotor rotational axis defined therein, and b. the stator is movable along a helical path about the rotor rotational axis.

4. The colloid mill of claim 1 wherein:

a. a member extends from one of the stator and the casing into a slot defined within the other of the stator and the casing, and b. the slot extends along a helical path.

5. The colloid mill of claim 1 wherein:

a. the casing has a slot defined therein, and b. a member extends from the stator through the slot, whereby moving the member along the slot moves the stator within the casing.

6. The colloid mill of claim 5 wherein:

a. the member has a knob threaded thereon, and b. rotating the knob about the member fixes the member within the slot.

7. The colloid mill of claim 5 wherein the slot follows a helical path.

* * * * *